Nov. 5, 1946.  C. L. EKSERGIAN  2,410,573
WHEEL AND RIM ORGANIZATION
Filed June 6, 1942

INVENTOR
Carolus L. Eksergian
BY John P. Barbour
ATTORNEY

Patented Nov. 5, 1946

2,410,573

UNITED STATES PATENT OFFICE 2,410,573

WHEEL AND RIM ORGANIZATION

Carolus L. Eksergian, Detroit, Mich., assignor to The Budd Company, Philadelphia, Pa., a corporation of Pennsylvania Application June 6, 1942, Serial No. 446,005

4 Claims. (Cl. 301—63)

The invention relates to a wheel body and rim organization and more particularly to such an organization adapted for the mounting of heavy duty pneumatic tires.

It is among the objects of the invention to provide a device of this class which facilitates the mounting and demounting of the tire, which insures the locking of the tire to rim both in the inflated or deflated condition, and which provides for a strong connection of the wheel body and rim with a minimum of weight consistent with the strength required.

To secure the easy mounting and demounting of the tire, the rim seating the tire is preferably made in two sections, one being fixed to the wheel body and including a rim base portion having a tire retaining flange at one margin thereof and having the other margin thereof overlapping and secured to a peripheral flange of a disc wheel body, and the other being a rim flange section demountably telescoping the margin of the first section which is secured to the wheel. Means are provided to detachably clamp said second section in place.

To insure the locking of the tire on the rim base in both inflated and deflated condition, and yet permit its easy mounting on the rim base, the margin of the base of the section overlapping the wheel flange is preferably of an outside diameter slightly less than the inside diameter of the beads of the tire to be mounted on the rim, but the part of the rim base from approximately a medium plane of the rim being of gradually increasing outside diameter, which diameter, at the bead seating portion adjacent the inboard flange, is slightly greater than the inside diameter of the tire bead, so that as the tire is forced home on the rim, the inner bead will be forced up this inclined seat and strongly frictionally interlocked with the rim. Similarly the demountable rim flange section is provided with an inwardly extending portion of approximately the width of a bead seat of the tire which telescopes over the less diameter outboard margin of the first rim section and this portion is also of a tapered section, having an outer diameter of gradually increasing length corresponding to the outer diameter of the rim adjacent the opposite tire retaining flange, so that when the demountable section is forced in place its inwardly extending portion will frictionally interlock with the adjacent tire bead seat.

The strong connection between the wheel body and the rim is obtained with a minimum of weight by providing a nested relation between the inclined portion of the disc wheel body adjacent its merger with the generally axially extending peripheral flange and the flange itself, with the outboard margin of said fixed rim section and the securement of the nested overlapping portions of the wheel body and rim by two axially spaced annular lines of securement. One such line of securement may be a usual annular series of rivets interconnecting the axially extending flange and rim section and the other line of securement farther outboard is achieved by the clamping in place of the demountable rim section. To this end, the extreme outboard margin of the fixed rim section is formed with a radially outer inclined seat and the demountable rim flange section is formed with a correspondingly inclined face engaging said seat. It may be firmly clamped to this seat by means extending between the wheel body and the demountable rim flange section, and such clamping action provides an additional line of securement along the line where the inclined portions of the wheel body, and the two rim sections overlap. This double securement insures adequate strength with less weight of metal in the wheel body periphery and the rim sections.

The clamping means may comprise an annular clamping ring of channel cross section, having one side wall of the channel seated against a radially extending peripheral portion of the disc wheel body and its other side wall seated against a shoulder on the demountable rim flange section. An annular series of bolts and nuts extending through the wheel body and clamping ring serves to securely clamp the parts together.

Other and further objects and advantages and the manner in which they are attained will be clarified by the following detailed description when read in connection with the drawing forming a part hereof.

Figure 1:
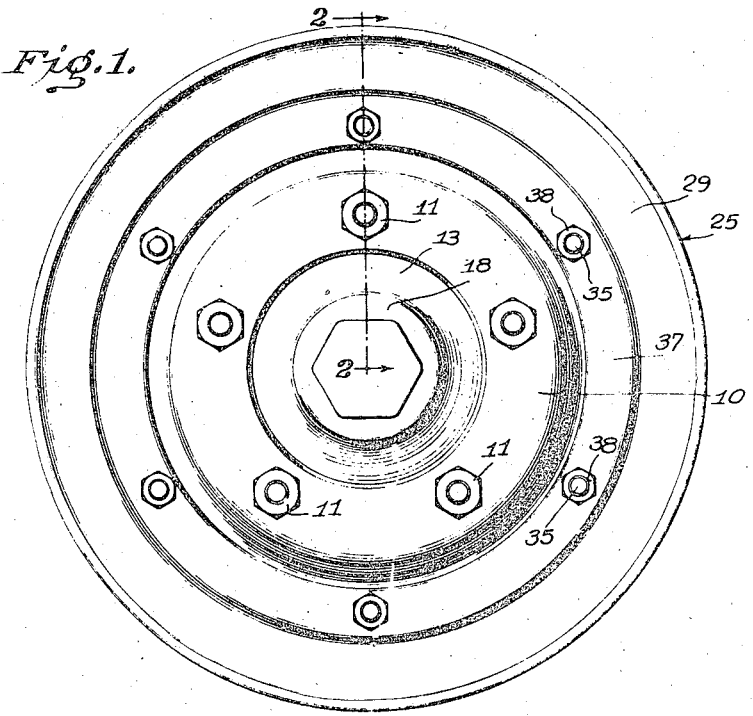
Fig. 1 is an outboard elevational view of a wheel embodying the invention.

The wheel and rim organization of the invention is shown, in the embodiment selected for illustration, associated with a tapered disc wheel body 10, demountably bolted, as by an annular series of securing bolts 11 to the outboard face of the hub flange 12. The hub flange is shown associated with a freely rotatable hub 13 mounted to rotate on a fixed axle 14 through spaced antifriction bearings indicated at 15 and 16. The hub and bearings are secured in place by the usual axle nut 17 and the hub is closed at its outer end by the hub cap 18.

A large diameter brake drum 19 disposed closely adjacent the rim has its head secured to the inboard side of the hub flange 12 by the same series of bolts 11 securing the wheel body in place.

The wheel organization so far described is conventional and is merely one form of such organization out of many with which the main features of the invention now to be described in detail may be associated.

To add strength to the wheel body 10 and to bring the tread in the desired inboard position the wheel body 10 outwardly of its central bolted-on portion is deeply dished at 20 and at its periphery this deeply dished portion merges with a generally radially extending portion 21, which in turn merges through a rounded or inclined portion 22 into the generally axially inwardly extending rim seating flange 23.

To facilitate the mounting of the heavy duty pneumatic tires adapted to be used with the invention, the rim is made in two continuous annular sections, a fixed section 24 and a demountable section 25. The fixed section comprises a generally axially extending rim base portion 26 terminating at its inboard end in a tire retaining flange 27 and having its outboard end nesting with the rounded or inclined portion 22 of the wheel body and its flange 23 and secured thereto.

The outboard portion of base 26 up to about the point 28 is of slightly less outside diameter than the inside diameter of the tire bead of a tire to be associated therewith. Inboard from the point 28 to flange 27, or for approximately half the width of the tire base 26, its outer diameter gradually increases, so that, in the region of the tire bead seat thereon adjacent the flange 27, it is of slightly greater outside diameter than the inside diameter of the tire bead.

This arrangement of the rim base facilitates the placing of the heavy tire on the rim since it readily passes over the smaller diameter outboard portion of the rim base 26 and can be readily forced up the gradual incline formed by the gradually increasing diameter until the inner bead seats against the inboard flange. In this position, by reason of the practically inextensibility of the tire bead, the bead will, by reason of the slightly larger outside diameter of the rim base than the inside diameter of the tire bead, be firmly frictionally locked to the tire base, so that it will rotate therewith, even when the tire becomes deflated.

To secure the tire in place and to additionally frictionally interlock it with the rim, the demountable rim section 25 is provided with an outboard tire retaining flange 29 and a tapered inward extension 30 freely telescoping over the outboard end of the rim base 26. This tapered inward extension is of approximately the width of the tire bead to be associated therewith and has a tapered outer diameter, like the tapered outer diameter adjacent the flange 27 of the rim base 26, slightly greater than the inner diameter of the tire bead, so that, when the demountable rim section is forced to its seat, the tire bead associated therewith will also be firmly frictionally locked to the rim.

To enable the use of lighter gauge metal in the joint between the wheel body 10 and the internesting outboard end of the rim base portion 26 of the fixed rim section 24, two annular lines of securement are preferably provided between said overlapping and internesting parts. One such line of securement may comprise a usual annular series of rivets, as 31, these rivets connecting the generally axially extending flange 23 to the rim section 24.

For the additional line of securement, the improved construction employs the action of the clamping means for holding the demountable rim flange section 25 in place.

Figure 2:
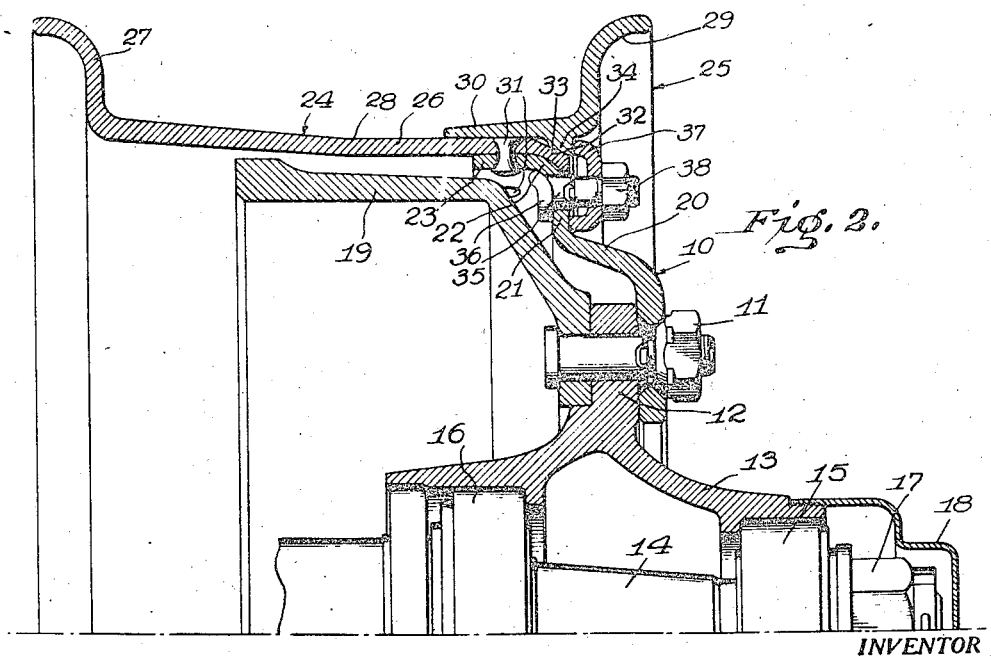
Fig. 2 is a sectional view on an enlarged scale taken substantially along the lines 2—2 of Fig. 1.

As shown in Fig. 2, the extreme outboard edge of the rim base 26 overlaps in nested relation the rounded or inclined portion 22 of the wheel body and radially outwardly of this region, it is provided with an inclined seat 32 adapted to co-act with a correspondingly inclined seat 33 on a short radial projection 34 of the demountable section 25.

To clamp the demountable rim flange section 25 in place, as shown in Fig. 2, clamping means is provided extending between the wheel body and said section 25, which acts to securely clamp the outboard margin of the rim base portion 26 to the wheel body approximately along the line of said interengaging inclined portions, thus providing the second line of securement additional to that provided by the rivets 31.

The clamping means may comprise an annular series of bolts, as 35, extending axially through the radially extending portion 21 of the wheel body closely adjacent to the rounded or inclined portion 22 thereof. In fact, the heads 36 of the bolts are deformed to provide portions backing up the rounded portion 22 of the wheel body, as clearly appears in Fig. 2.

The bolts 35 pass through the base of a hollow or channel section clamping ring 37, having one side seated against the radial portion 21 of the wheel body and the other side, against a shoulder formed by the short inward extension 34 on the demountable rim flange section 25. Nuts 38 associated with the bolts 35 bear against the outboard face of the clamping ring and when tightened, in addition to locking the tire in place on the rim, operate to clamp the overlapping inclined parts of wheel body 10 and rim section 24 securely together in a region outboard of the riveted connection. Thus, the clamping means for securing the demountable rim section 25 has the two functions of holding the tire in place on the rim and forming a strong connection between the wheel body and rim.

While a specific embodiment of the invention has been described, it will be understood that the main features may be produceable in other specific embodiments which would readily occur to one skilled in the art, and it is desired to cover such in the following claims.

What is claimed is:

1. A wheel and rim organization for wheels equipped with heavy duty pneumatic tires comprising a disc wheel body having a peripheral axially extending rim seating flange, a continuous annular rim section comprising a base and a tire retaining flange at one margin of the base, the other margin of said base being turned radially inwardly and seating in nested overlapping relation with said axially extending rim seating flange and the adjacent radially extending wheel body portion and being secured thereto in the overlap by an annular series of circumferentially spaced securing means, the extreme margin of said rim base beyond said securing means having a smooth inclined seat, a continuous demountable tire retaining rim flange section having a mating inclined seat engaging the inclined seat on the first-named rim section, and clamping means engaging the wheel body and the demountable rim flange section so as to cause said inclined seat on the demountable section to ride up on the correspondingly inclined seat on the first-named section and thereby tightly clamp, with a large radial component of force, the margin of the first-named section carrying said inclined seat to the wheel body, and so providing additional means, axially spaced from said annular series of securing means, for securing the rim to the wheel body.

2. A wheel and rim organization for wheels equipped with heavy duty pneumatic tires, comprising a disc wheel body having a radially extending portion adjacent its periphery terminating in an axially inwardly extending rim seating flange, a rim section including an inboard tire retaining flange and a base having one margin thereof seated on said flange and secured thereto, said margin having a radially outer inclined seat, a demountable tire retaining rim flange section having a radially inwardly projecting portion with an inclined seat resting on said first-named inclined seat, and clamping means including a clamping ring having in-turned margins engaging respectively the outboard faces of the radially extending portion of said wheel body and the demountable rim section, and an annular series of spaced clamping bolts between said wheel body and said ring for forcibly clamping the demountable rim section in place and at the same time clamping the first-named rim section firmly into engagement with the wheel body flange, thereby serving as part at least of the securing means between wheel body and rim.

3. A wheel and rim organization comprising a disc wheel body having a generally radially extending portion merging through an inclined portion into an axially inwardly extending peripheral flange, a fixed rim section having the radially inner face of its axially outer margin nesting with said inclined and flange portions of the wheel body, the radially outer face of said margin being provided with a smooth inclined seat, a demountable rim flange section having an inclined face arranged to engage said inclined seat and means for clamping said demountable rim section in place and cause its inclined face to ride up its cooperating inclined seat and clamp together, with a large radial component of force, the nesting inclined portions of said wheel body and the axially outer portion of said fixed rim section, said clamping means comprising a bolt having a head with a portion thereof backing up the inclined portion of the wheel body, a clamping element spaced from the wheel body and rim in its intermediate portion, and at its margins engaging the radially extending portion of the wheel body and the demountable rim flange section, respectively, said bolt extending through the intermediate portion of said clamping member and a nut screwed onto the bolt and engaging the axially outer face of the clamping member, whereby the tightening of said nut clamps the parts of the rim and wheel body together in their internested relation.

4. A wheel and rim organization comprising a wheel body having at its periphery a rim securing seat including an axially extending portion merging at its axially outer margin into a curved portion, a fixed rim section having its outer margin formed to nest with the axially extending and curved portions of said rim securing seat, said rim section having its said axially outer margin formed with a radially outer smooth inclined seat, a demountable rim section having a radially inner inclined seat mating the inclined seat on said fixed rim section, and clamping means securing said rim sections to each other and to the rim securing seat of said wheel body, said clamping means having parts engaging the wheel body and the demountable rim section and acting to force said demountable section axially toward the fixed section and cause its inclined seat to ride up the smooth mating inclined seat of said fixed section and thereby exert strong radial components of force effective to strongly clamp together the nested portions of the fixed rim section and the rim securing seat of the wheel body.

CAROLUS L. EKSERGIAN.